United States Patent [19]
Rutledge et al.

[11] Patent Number: 5,579,033
[45] Date of Patent: Nov. 26, 1996

[54] POINTING DEVICE FOR RETROFITTING ONTO THE KEYBOARD OF AN EXISTING COMPUTER SYSTEM

[75] Inventors: Joseph D. Rutledge, Mahopac; Edwin J. Selker, New York, both of N.Y.

[73] Assignee: International Business Machines Corporation, Armonk, N.Y.

[21] Appl. No.: 886,662

[22] Filed: May 20, 1992

[51] Int. Cl.$^6$ ........................................................ G09G 5/08
[52] U.S. Cl. ............................................ 345/161; 345/156
[58] Field of Search ...................................... 345/156–161

[56] References Cited

U.S. PATENT DOCUMENTS

| | | | |
|---|---|---|---|
| 3,524,921 | 4/1970 | Wolf | 174/117 A |
| 4,313,113 | 1/1982 | Thornburg | 340/709 |
| 4,680,577 | 7/1987 | Straayer et al. | 340/711 |
| 4,698,626 | 10/1987 | Sato et al. | 340/710 |
| 4,736,191 | 4/1989 | Matzke et al. | 340/365 C |
| 4,799,049 | 1/1984 | Avila | 340/709 |
| 4,935,728 | 6/1990 | Kley | 340/709 |

FOREIGN PATENT DOCUMENTS

| | | | |
|---|---|---|---|
| 0149709 | 6/1991 | Japan | 174/117 A |

OTHER PUBLICATIONS

Rutledge et al., "Force-to-Motion Functions for Pointing," Proc. of the IFIP TC 13 Third International Conference on Human-Computer Interaction, pp. 701–706, 1990.

Reinhardt, Andrew "Touch-and-Feel Interfaces," BYTE, pp. 223–226, 1991.

Card et al. "Evaluation of Mouse, Rate-Controlled Isometric Joystick, Step Keys, and Text Keys for Text Selection on a CRT," ERGONOMICS, vol. 21, No. 8, pp. 601–613, 1978.

Bennett, Jr., et al. "Cursor Movement Control Circuitry," IBM Technical Disclosure Bulletin, vol. 21, No. 3, pp. 1184–1186, 1978.

*Primary Examiner*—Ulysses Weldon
*Attorney, Agent, or Firm*—Heslin & Rothenberg, P.C.

[57] ABSTRACT

A pre-connected pointing device assembly retrofitable onto the keyboard of an existing computer system includes an analog input unit and a digital input unit physically and electrically interconnected to a data processing unit by flexible bands. The units and flexible bands are adhesively secured to the keyboard. The analog input unit is placed between two of the keys of the keyboard and the digital input unit is placed at the edge of the keypad area, preferably below the space bar. The data processing unit can be configured to fit in a recess at the rear of the keyboard.

17 Claims, 8 Drawing Sheets

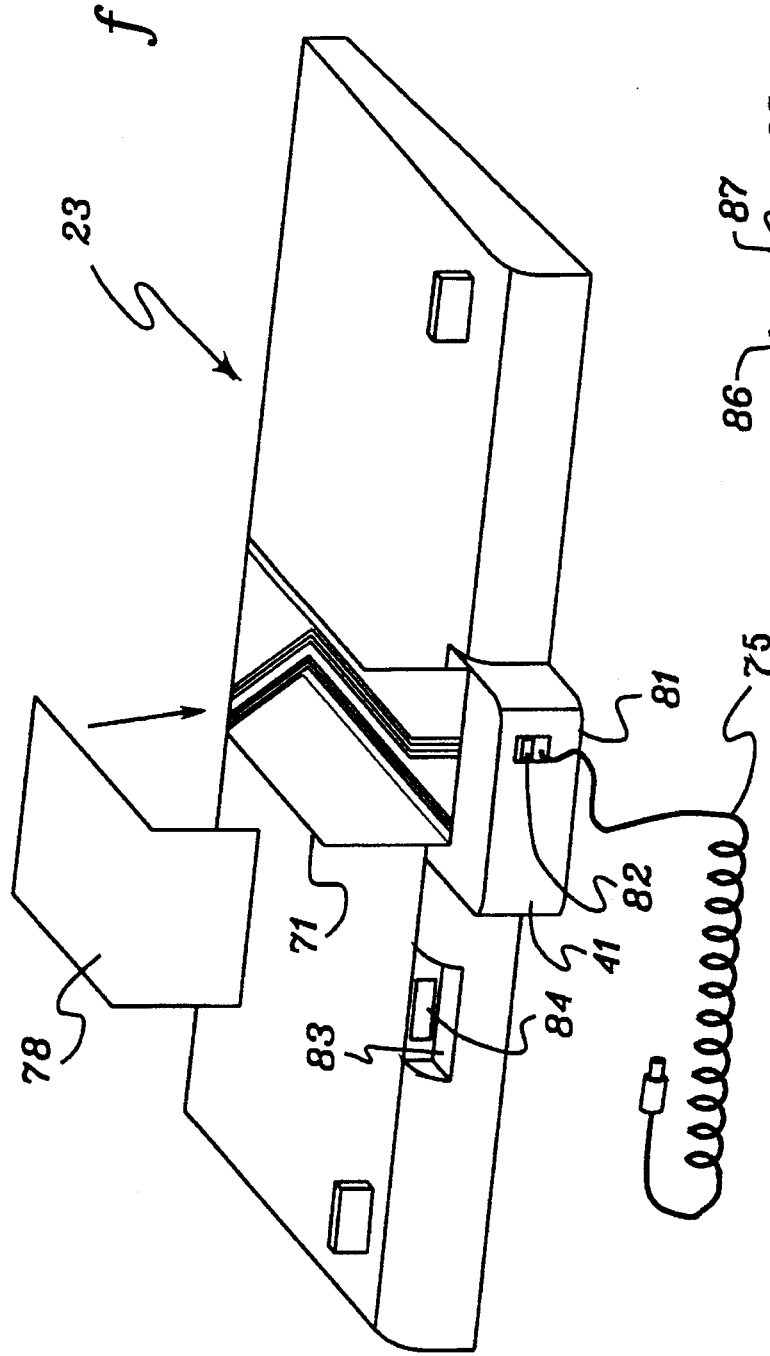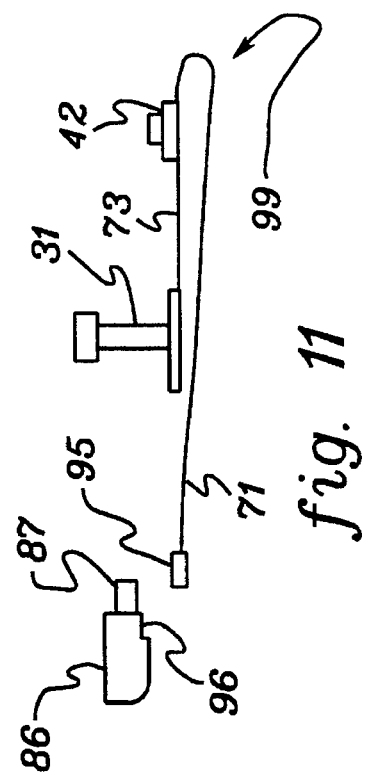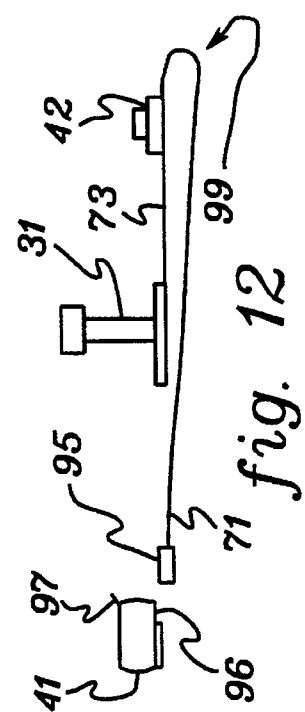

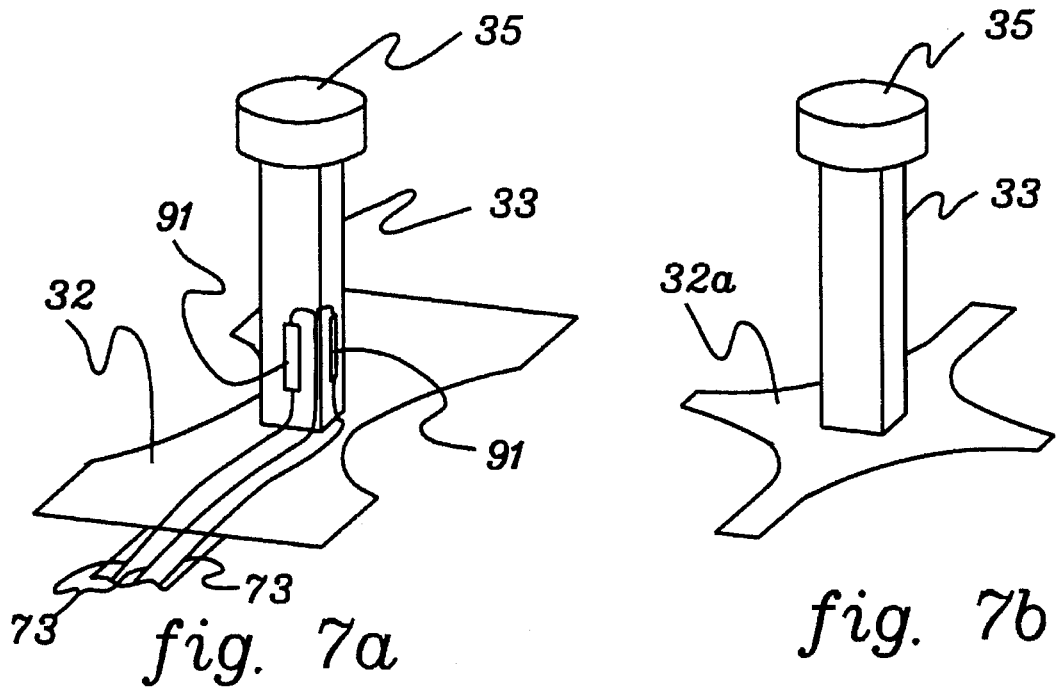
fig. 7a    fig. 7b
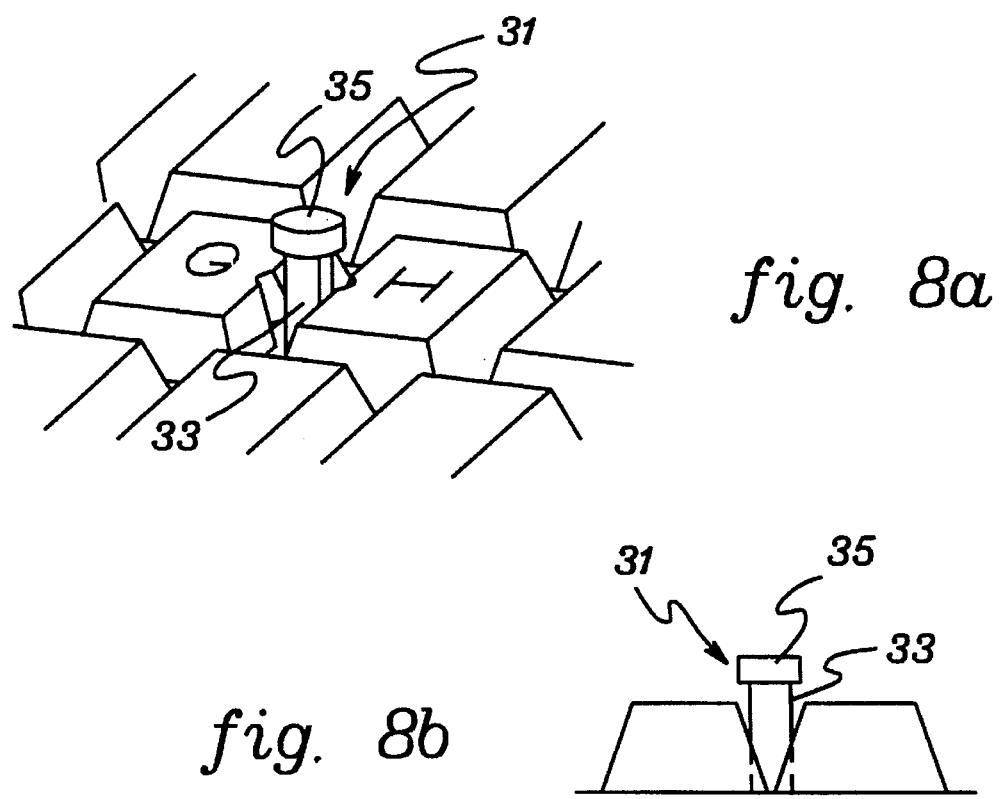
fig. 8a
fig. 8b

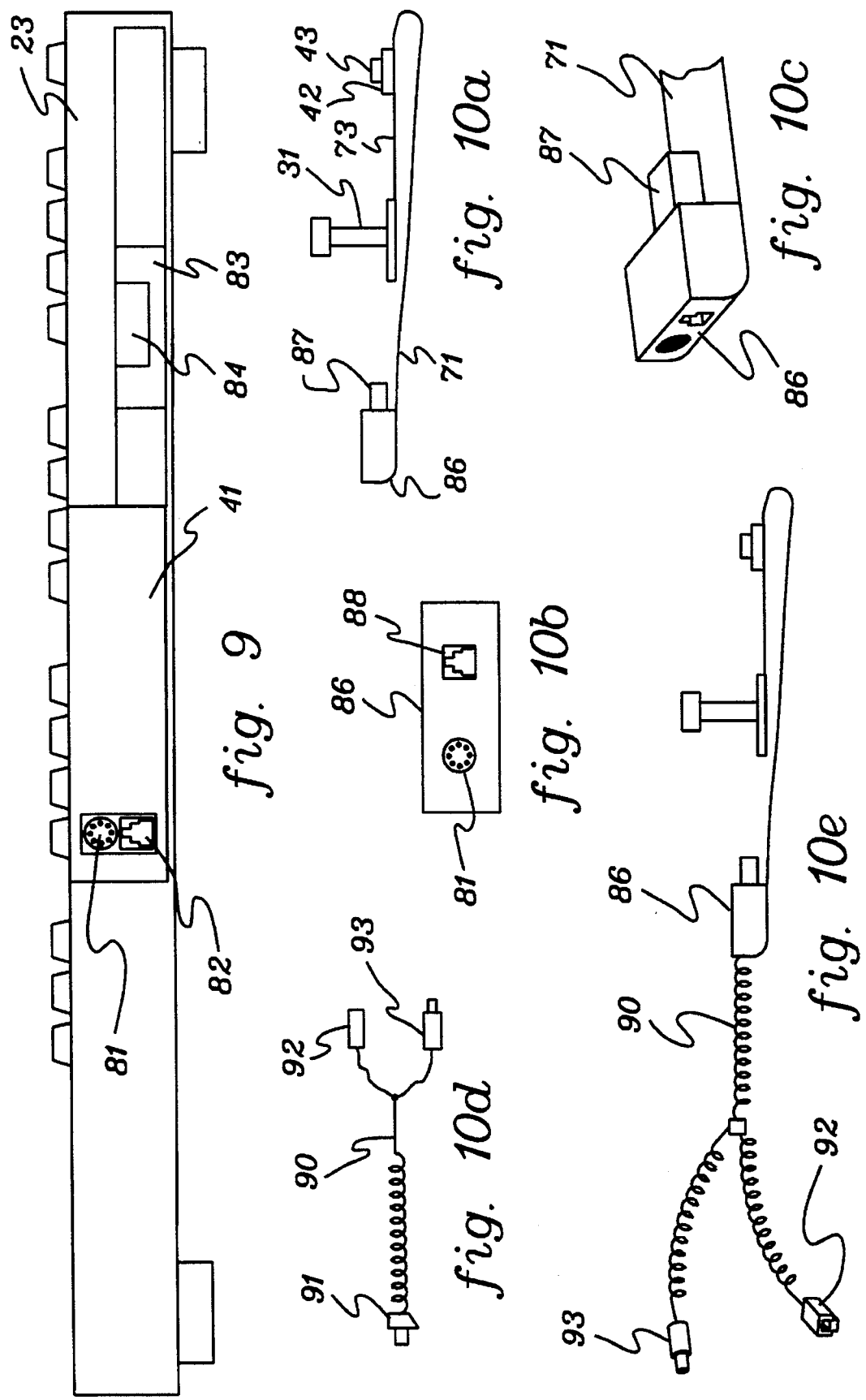

POINTING DEVICE FOR RETROFITTING ONTO THE KEYBOARD OF AN EXISTING COMPUTER SYSTEM

FIELD OF THE INVENTION

This invention relates in general to the interaction of humans with computers. More specifically, it relates to pointing devices for controlling a cursor on a computer screen and, particularly, to the retrofitting of a keyboard of an existing computer system with a pointing device.

BACKGROUND ART

Pointing devices are one of the channels of communication developed for human interaction with a computer. As is well known in the art, pointing devices, among other things, help the computer operator control the movement of a cursor on a computer screen and to access and obtain various results from a computer depending upon the software program being used.

Prior pointing devices include the mouse, track ball and joy stick. These devices require removal of the operators hands from a keyboard in order to access and operate them. This results in distraction, loss of time, and the need for space adjacent to the keyboard for their operation.

A pointing device that can be operated from the typing position of a keyboard and thus avoids loss of time and distraction is described in the article "Force-to-Motion Functions for Pointing", by Joseph D. Rutledge and Ted Selker from *Human-Computer Interact* '90, North Holland Publishing, 1990, which is incorporated herein by reference. According to this article, a pointing stick and associated sensor assembly are mounted on the sub-key surface of a keyboard such that the stick protrudes between and above the "G" and "H" key caps. These key caps are relieved at their bases to accommodate the pointing stick. The top of the pointing stick " . . . is rounded to provide a comfortable fingertip grip. To provide mouse button signals, two microswitches and operating buttons are mounted nearly flush, just below the space bar, convenient to the thumbs", *Human-Computer Interact* '90, supra page 702. Since the pointing device described in this article can be operated from a typing position as part of the act of touch typing, it avoids the problems inherent in using a separate mouse, track ball, or joy stick.

An important characteristic of any new pointing device is its adaptability for use on existing computer systems. With the recent proliferation of personal computers for home, business and portable use, the success of a new pointing device is dependent upon its ability to be retrofitted in an economical, easy and efficient manner into existing computer systems.

DISCLOSURE OF INVENTION

The apparatus of the present invention represents an improvement over the prior art by providing an integrated pointing device which is especially designed to be easily retrofitted into the keyboard of an existing computer system. This avoids the necessity of purchasing a new keyboard with the device already built in. Further, an individual with minimal knowledge of computers can easily install the pointing device of the present invention without the need of any tools, other than a simple device to remove key caps, and can do so easily and effortlessly in a short period of time.

It is an additional aspect of this invention that the retrofitted pointing device can be easily integrated with the operation of other pointing devices such as a computer mouse or track ball and can use the same hardware and software interfacing means as such auxiliary pointing devices.

According to the principles of the present invention, a pre-connected computer pointing device assembly is provided which is especially designed to be easily retrofitted into the keyboard of an existing computer system. The pre-connected pointing device assembly includes an analog input means for sensing tactile input and producing a first signal representative thereof, digital input means for producing a second signal, and data processing means which receives and processes the first and second signals and serves as an interface to the computer system. The analog input means, the digital input means, and preferably, the data processing means are attached at strategic sites on the keyboard of the existing computer system. The analog input means is integrated into the keyboard of the computer, among the keys of the keyboard.

In a further aspect of this invention, the major components of the retrofitable pointing device assembly are physically and electrically pre-connected in a particular fashion to facilitate ready installation on a keyboard. The data processing unit, analog input unit and digital input unit of the pointing device assembly are physically interconnected by thin flexible strips of material. The strips also support the electrical interconnections between these units. The analog input unit is electrically connected via the bands to the data processing unit, as is the digital input unit. The pointing device assembly is sized and configured so that when installed, the analog input unit fits in between the keys of the keyboard with an especially configured first strip of flexible material and the associated electrical leads from the analog input unit running between the keys of the keyboard without interfering with the operation of the keys. The first band connects to the digital input unit which is placed in an appropriate and convenient spot on the frame of the keyboard such that it can easily be operated in connection with the analog input unit, without restricting the normal act of touch typing. A second band extends from the digital input unit along the underside of the base of the keyboard to the data processing unit. The data processing unit is preferably secured to the rear of the keyboard.

In accordance with an additional aspect of the present invention, the actual retrofitting of the pointing device assembly can be done with only one tool, a clip to remove some of the keyboard key covers. The process entails removing a few of the key caps or covers, such as the G, H, V and B key caps of a standard computer keyboard, as well as the space bar cap. The analog input unit, e.g. an isometric pointing stick, with a base configured to fit between two of the keys of the keyboard and a thin square shaft configured to rise from that base above the surrounding keys is secured to the keyboard key pad surface area between the G and H keys. The first connective band or strip is run from the analog input unit along the key pad surface area between keys to the edge of the key pad area. The digital input unit at the other end of the first strip is placed at an open site on the keyboard frame, preferably just below the space bar. The second interconnecting band extending from the digital input unit to the data processing unit is then secured to the bottom of the keyboard. The data processing unit is preferably secured to the rear of the keyboard. The G and the H key caps are replaced with modified key covers designed to accommodate the presence of the analog input unit. The other earlier removed key caps and the space bar cap are then replaced. Finally, the data processing unit is connected to the CPU (Central Processing Unit) of the computer.

In accordance with a further aspect of the present invention, the pre-connected pointing device assembly, the clip to remove selected key caps, the replacement key covers modified to accommodate the pointing stick, an electrical output cable and a protective sheet can be provided in kit form to facilitate rapid and easy retrofit of a keyboard of an existing computer system.

BRIEF DESCRIPTION OF THE DRAWINGS

The foregoing and other objects, features and advantages of the invention will be apparent from the following detailed description of a preferred embodiment of the invention, as illustrated in the accompanying drawings in which:

FIG. 2A depicts an alternate embodiment of the replacement key caps;

FIG. 5 provides a view of the bottom of a keyboard with the apparatus of the present invention installed;

FIG. 7A depicts the analog input device in one configuration with its component parts;

FIG. 7B depicts the analog input device with a different base configuration;

FIG. 8A provides a perspective view of the analog input device of the present invention installed between two keys of a computer keyboard;

FIG. 8B provides a front elevational view of the analog input device of the present invention installed between two keys of the keyboard;

FIG. 9 depicts the rear of an IBM "G" keyboard with its keyboard outlet recess;

FIG. 10A depicts a side view of the pointing device assembly with an alternate version of the data processing housing;

FIG. 10B depicts a rear view of the alternate version of the data processing housing;

FIG. 10C depicts an elevated view of the alternate version of the data processing housing;

FIG. 10D depicts a cord to be used with the alternate version of the data processing housing; and FIG. 10E depicts the cord and alternate version of the data processing housing as one unit.

BEST MODE FOR CARRYING OUT THE INVENTION

Figure 1:
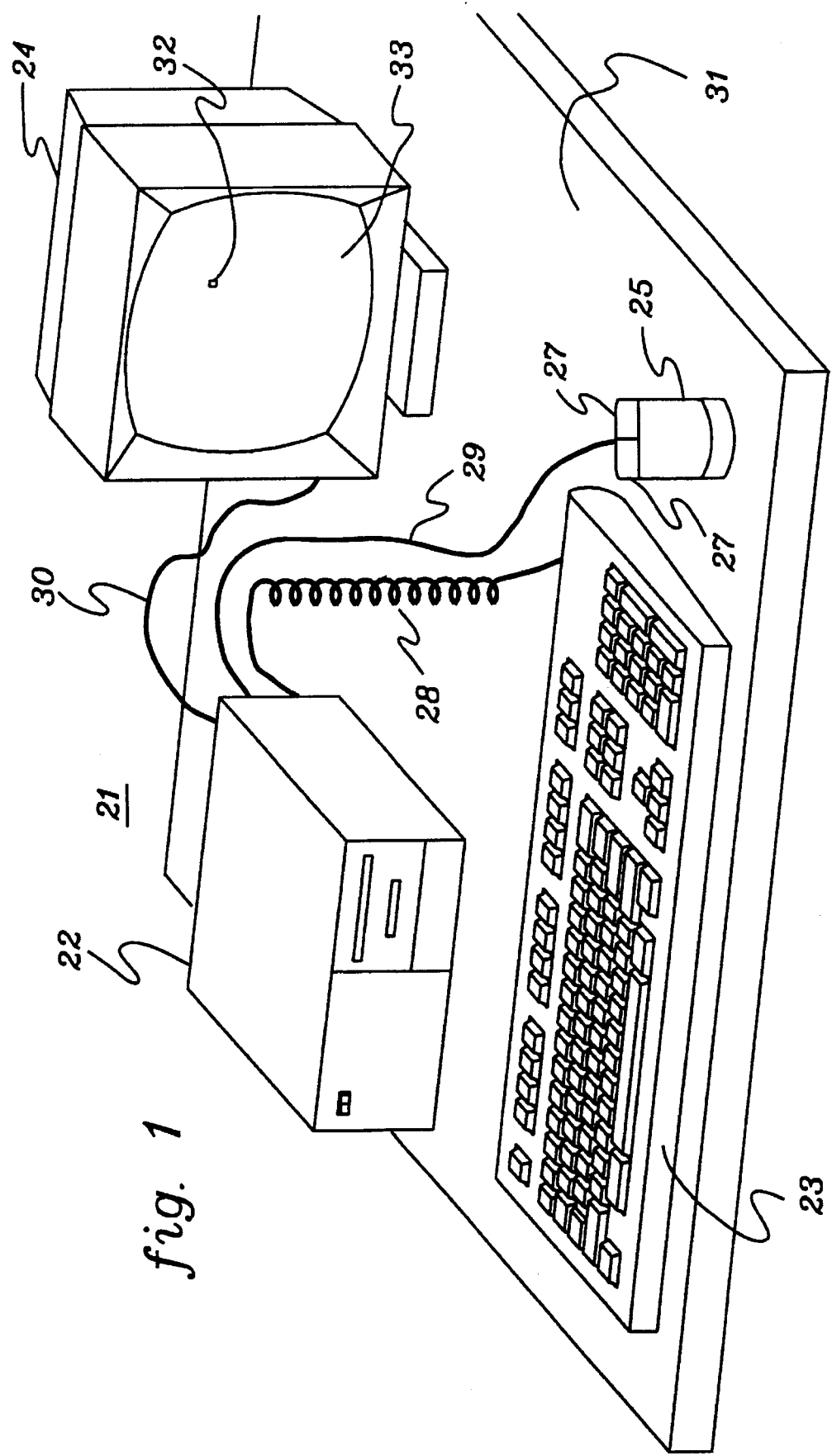
FIG. 1 depicts some of the major components of current computer systems.

FIG. 1 shows an existing computer system 21 without the present invention installed. Generally the existing computer system includes a CPU 22, a keyboard 23, an electrical cable or cord 28 connecting keyboard 23 to CPU 22, and a cathode ray tube monitor 24 connected by cable 30 to CPU 22. The CPU 22 could be any standard Central Processing Unit used in a personal or micro computer system. A mouse 25 which can be used to perform a pointing function within the system is also shown. Mouse 25 typically includes a roller mechanism (not shown) on its undercarriage and a pair of buttons 27 on its upper surface. In known fashion, mouse 25 can be manually moved about table top 31 to selectively reposition a cursor 32 on a viewing screen 33 of monitor 24. Buttons 27 are activated to signal a desired cursor 32 location. Cord 29 connects mouse 25 to CPU 22. In the system depicted in FIG. 1, the hand of the computer operator has to be removed from the keyboard 23 to use the mouse 25. Additionally, there has to be sufficient table top space adjacent to the keyboard to roll the mouse 25 around.

Figure 2:
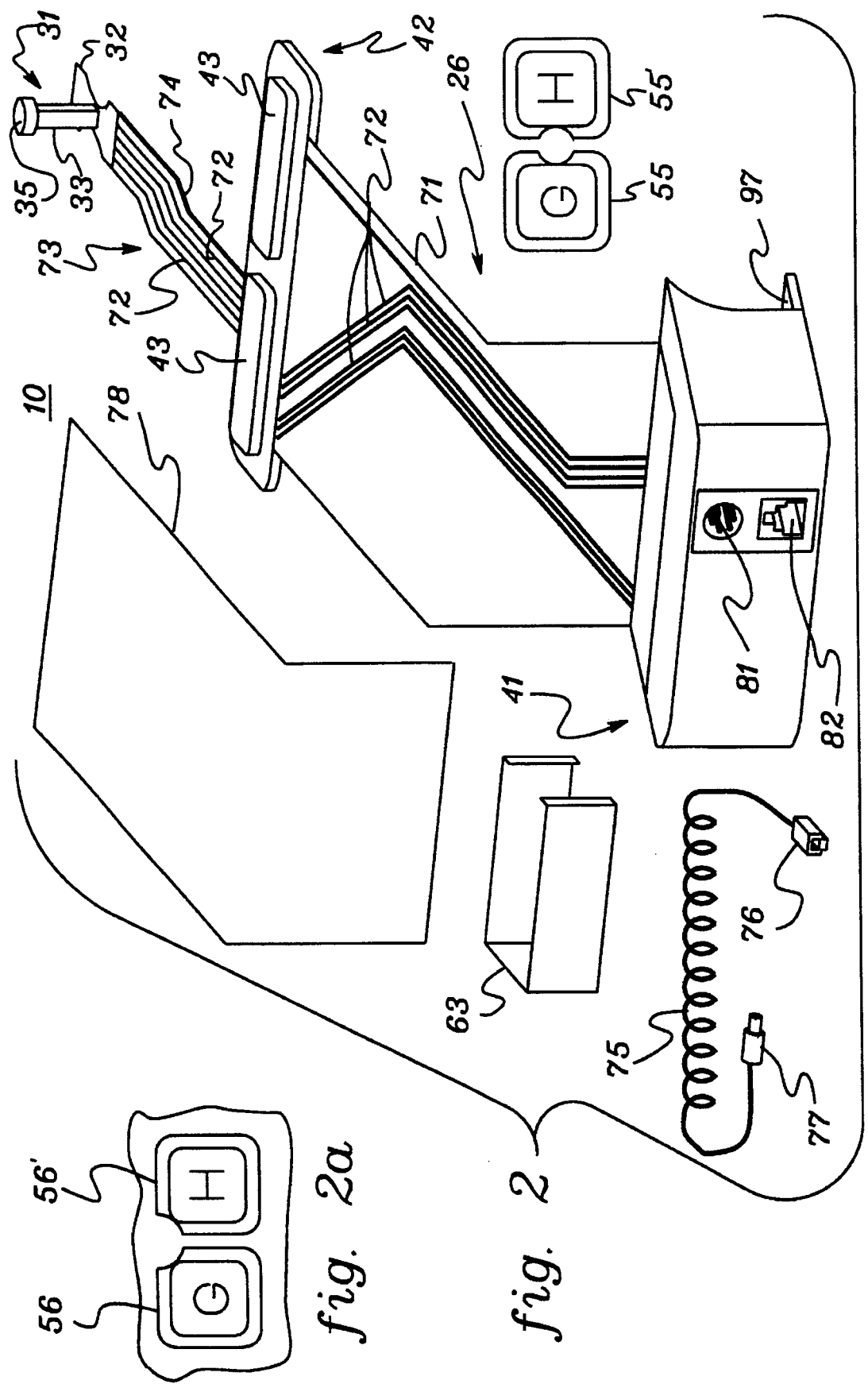
FIG. 2 provides a view of the pointing device assembly ready to be retrofitted into a computer keyboard pursuant to the present invention, together with replacement key caps and key cap remover.

The basic components of a kit 10 of the present invention are depicted in FIG. 2, ready to be retrofitted onto an existing keyboard. The major component of the kit is the pointing device assembly 26. Pointing device assembly 26 consists of a data processing unit 41, a digital input unit 42 and an analog input unit 31 which are physically and electrically interconnected and pre-assembled, as shown and hereinafter described. The digital input unit 42 is physically connected to the data processing unit 41 by a relatively wide, flat strip 71 of thin, flexible material such as MYLAR® (a registered trademark of E. I. Du Pont DeNemours and Company). The digital input unit 42 is electrically connected to data processing unit 41 via some of the electrically conductive paths or leads 72 which are imbedded in or supported by strip 71. The analog input unit 31 is physically connected to the digital input unit 42 by a second, relatively narrow, flat strip 73 of thin, flexible band material. Strip 73 is specifically configured to fit between keys of the keyboard to be retrofitted. The analog input unit 31 is electrically connected to data processing unit 41 by electrically conductive paths 72 which run along strip 73 and then along strip 71 to data processing unit 41.

The data processing unit 41 preferably has a port 81 for inputting a signal from a mouse, or other auxiliary pointing devices, and an outlet 82 for sending the signals generated and processed by the data processing unit to the CPU 22. The data processing unit is powered by the computer system in the same way a mouse is powered by a computer system.

The analog input means 31, in the preferred embodiment, is a pointing device such as the isometric pointing stick described in the earlier referenced article by Rutledge and Selker. As such, it would have a thin rigid base 32 supporting an upright shaft 33 and a sensor assembly. Further details of analog input unit 31 are presented hereinafter in connection with FIG. 7A and FIG. 7B.

The digital input unit 42 is a low profile key pad with keys 43. The keys have a function similar to the mouse keys 27, FIG. 1. The key pad 42 in the preferred embodiment is placed at the bottom of the keyboard between the space bar and the user.

The thin connective strips 71 and 73 are formed of a very flexible and resilient material, such as MYLAR®. In the preferred embodiment, an adhesive is placed on the side of the connective strips 71 and 73 which face a surface of the keyboard. Electrically conductive paths for leads 72 can be formed in or on strips 71 or 73 in known fashion. In the preferred embodiment, there is no need to provide shielding for the electrically conductive paths 72 under normal operating conditions. The frequency range of the signals normally transmitted over the conductive paths 72 (i.e., around 100 Hz) makes them generally immune to interference. However, if the environment in which the keyboard were to be used presents sources of interference not usually encountered, a shielding plane or ground plane can be added. In the preferred embodiment, a sheet of protective material 78, such as vinyl, protects the otherwise exposed connective strip 71. Sheet 78 has the same general contours as strip 71 and preferably has a pre-coat of adhesive on one side to secure it over strip 71 during installation.

Various known adhesives can be employed to secure strip 71 and 73, as well as analog input unit 31, digital input unit 42 and data processing unit 41 to a keyboard. There are a number of methods that can be used to place adhesive on the parts of the pointing device assembly which are to be secured to the keyboard so that they are ready for installation at the appropriate time. One common method is to place the adhesive on the appropriate parts when assembled as a unit and then cover the parts coated with a wax paperlike covering which can be peeled off at the time of installation.

In the installation process, as it is described below, there will be a need to replace at least two of the key caps on the keyboard with modified key caps to accommodate the presence of the analog input unit 31. Depicted in FIG. 2 are two key caps 55 and 55' with appropriate modification to accommodate the analog input unit 31, between them. An alternate version of the two key caps 56 and 56', FIG. 2A, depicts modifications made to accommodate the presence of the analog input unit 31 near an upper corner of the keys. Key caps 56 and 56' would be used with a slightly altered version of the kit 10 in which the base of analog input unit 31 would be in the form depicted in FIG. 7B. However, the pointing device has the potential of being placed at just about any place on the keyboard, between any of the keys, when those keys are properly modified.

Clip 63 of FIG. 2 is a key cap remover. Clip 63 is used to remove key caps from the keyboard in an easy and expeditious manner without damaging them. Clip 63 comprises a strip of flexible material, e.g. aluminum, bent into a "U" shape to fit over the top of a key cap. The ends of clip 63 are curled inward to grip the bottom edge of a key cap.

Kit 10 can also include an interconnecting electrical cord 75 to carry the signal from the data processing unit 41 to the CPU 22. The cord 75 has a plug 76 at one end to plug into outlet 82 of the data processing means 41 and a plug 77 at its other end to plug into the appropriate port on the CPU 22. In the preferred embodiment this would be the same port normally used by a mouse.

Figure 3:
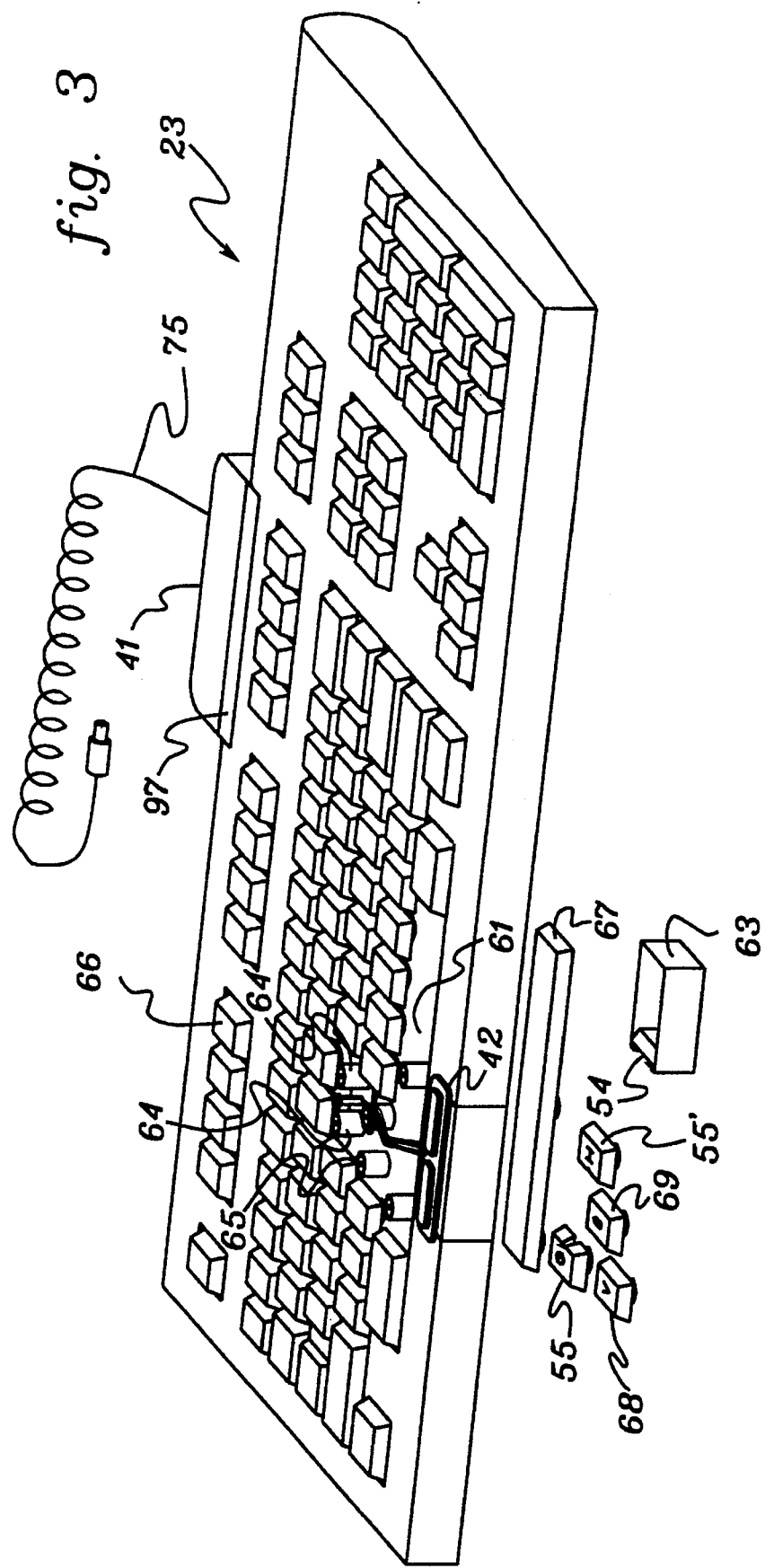
FIG. 3 provides an overhead view of the keyboard depicting the keyboard during one step of the retrofitting process of the present invention.

The items illustrated in FIG. 2 comprise all of the elements an individual would need to retrofit a keyboard with the pointing device of the present invention. The actual steps of installation are as follows:

Referring to FIG. 3, the first step is to remove the appropriate key caps from the keyboard 23. It is assumed that in the preferred embodiment the most convenient location to place the analog input unit 31 is between the "G" and "H" keys. Accordingly, the G, H, V, and B key caps (i.e. 55, 54, 68 and 69 respectively) are removed, together with the key cap 67 for the space bar.

Figure 4:
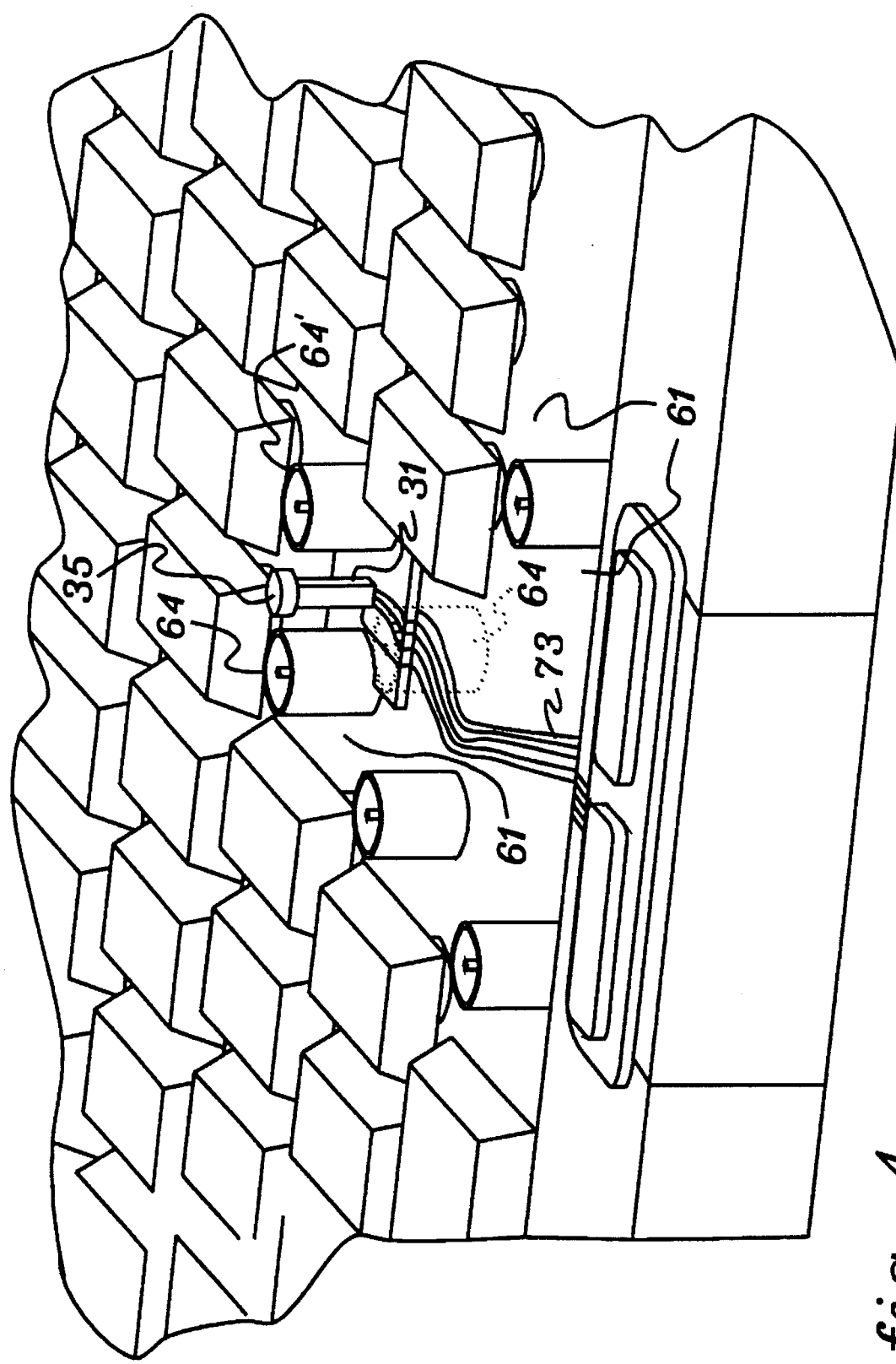
FIG. 4 provides a closer view than FIG. 3 of the keyboard with the analog input device placed in the keyboard during retrofitting prior to replacement of the key caps.

Referring to FIG. 4, the analog input unit 31 would then be situated between the "G" and the "H" keys. The base 32 of analog input unit 31, as depicted in FIG. 2 and FIG. 7A, would fit between the key cap support shafts 64 and 64' of the G and the H keys respectively. Base 32 is bonded by a firm and permanent bond to the upper surface of the base of the key pad area 61 with an appropriate adhesive. A double-stick tape can effectively secure the base 32 of the analog input unit 31 to the key pad area 61. Double-stick tape has an adhesive on both sides and can be easily applied during the installation process. The double-stick tape and the shape of the base 32, which fits in snugly among other structures in the key pad 32 area, together provide sufficient support for the analog input unit 31. Then the connective strip 73 is laid along the upper surface of the base of the key pad area 61. Strip 73, as shown in FIG. 2, has a jog 74 so that it readily follows a selective path, if necessary, between key cap support shafts. Strip 73 is then bonded to the base surface of the key pad area 61 by an appropriate adhesive.

Referring back to FIG. 3, the digital input unit 42, which in the preferred embodiment comprises a low profile key pad with two buttons 43, is secured to the keyboard just below the space bar. However, the pointing device assembly could be configured in other ways that would allow placement of the digital input unit 42 at different sites around the keyboard. The surface of the digital input unit 42 that abuts the surface of the keyboard is preferably pre-coated with an appropriate adhesive to form a firm and permanent bond to the keyboard.

Referring to FIG. 5, the keyboard is then turned over and the next step in the installation process involves laying the connecting strip 71 along the bottom of the keyboard and then placing the data processing unit 41, as depicted in FIG. 5, at the rear of the keyboard 23. The connecting strip 71 has, on the surface that faces the bottom of the keyboard, an adhesive to bond the connective strip 71 to the bottom of the keyboard 23. Also, the data processing unit 41 has adhesive on its surface that contacts the back of the keyboard 23 to secure the data processing unit 41 to the keyboard. Preferably, the data processing unit 41 is provided at its top with a band 97 of connective material, as shown in FIG. 2. Band 97 is adhesively secured to the top of the keyboard and provides a firmer bond to the keyboard for data processing unit 41.

Referring again to FIG. 5, once the data processing unit 41 has been secured to the back of the keyboard and the connecting strip 71 has been secured to the bottom of the keyboard, then the protective sheet 78 of a vinyl-like or other thin flexible protective material can be placed over and adhesively secured to the connecting strip 71. The exposed side of sheet 78 can be colored to blend in with the bottom of the keyboard.

In another version of the preferred embodiment, the protective sheet 78 could be adhered to connecting strip 71 during the manufacturing process. This would save a step in the installation process for the ultimate user and make the installation process easier.

Once the pointing device assembly is installed, the key caps removed from the keyboard are replaced. To accommodate the presence of the analog input device 31 placed between the "G" and "H" keys in the preferred embodiment, the modified "G" and "H" key caps, i.e. 55 and 55', replace the corresponding original key caps. Key caps 56 and 56', FIG. 2A, would be used in an alternate version of kit 10. The other temporarily removed key caps, including the "shift" key cap, are then replaced on the appropriate key shafts on the keyboard.

The keyboard is now ready for use. Keyboard cord 28, shown in FIG. 1, is connected between the keyboard outlet 84, shown in FIG. 5, and a keyboard port, not shown, of the CPU 22. Additionally, the data processing unit 41, secured to the rear of keyboard 23, is connected to the CPU by cord 75. Cord 75 interconnects outlet 82 of the data processing unit 41 to an appropriate port, not shown, on the CPU 22. In the preferred embodiment, this would be a port to which a mouse would normally be connected. Then, with the appropriate mouse software driver in the CPU 22, the keyboard with the retrofitted pointing device is ready for use.

Figure 6:
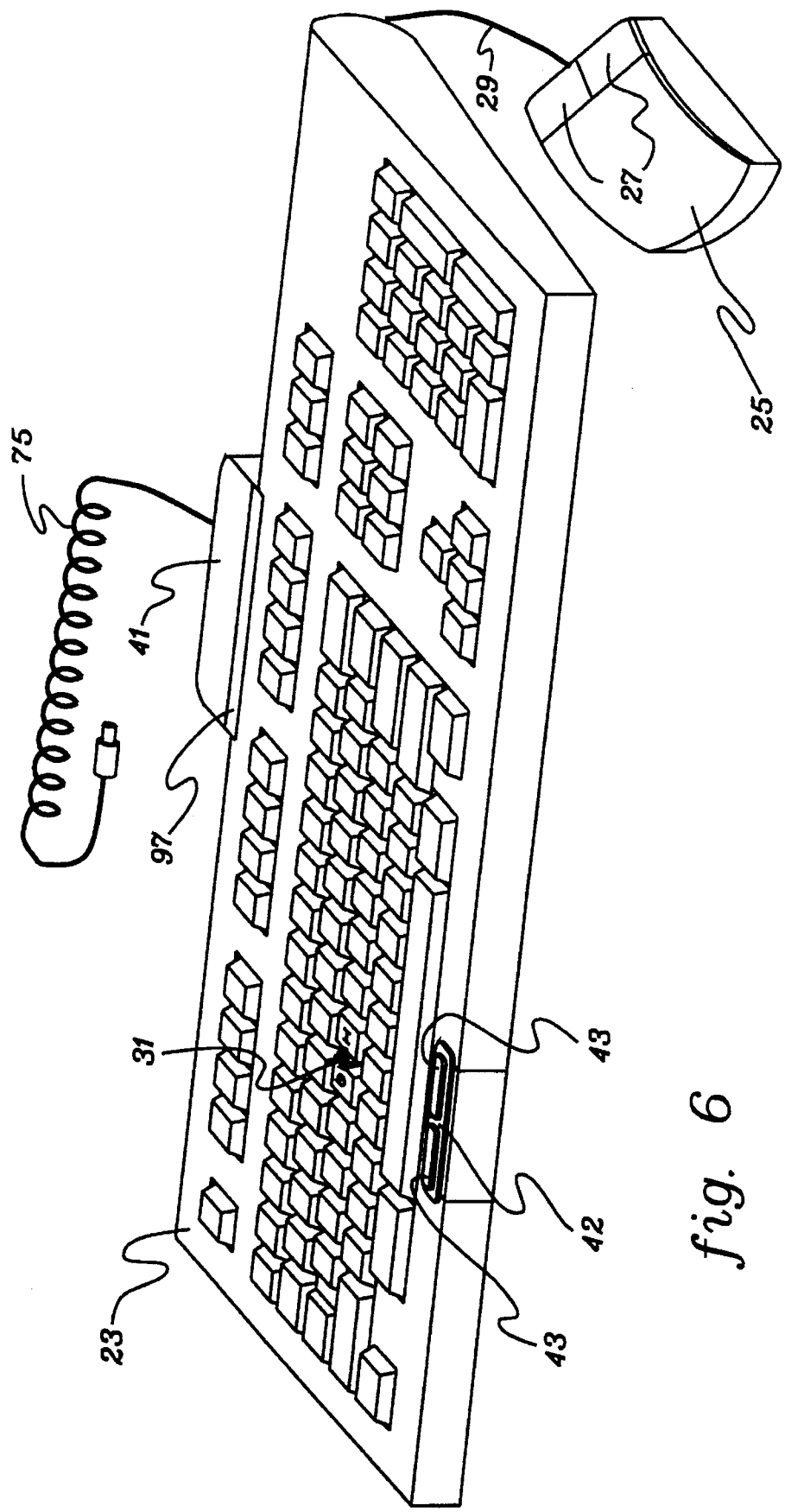
FIG. 6 depicts the top of a keyboard with the apparatus of the present invention installed.

FIG. 6 depicts the pointing device assembly, including the analog input unit 31, digital input unit 42 and data processing unit 41, installed as just described, on keyboard 23. Additionally, FIG. 6 shows a standard mouse 25 connected by cord 29 to the mouse port 81. Mouse port 81, depicted in FIG. 2, is at the rear of the data processing unit 41.

Reference is next made to FIG. 7A which depicts in greater detail an embodiment of the analog input unit 31 as an isometric pointing stick. This structure includes a rigid base 32 and a thin shaft 33 of square cross-section, permanently affixed to base 32, with a cup shaped, indented cap 35 at the top of the shaft. To provide solid contact for an operator's finger, the cap 35, in the preferred embodiment, is made of a "sticky rubber," i.e., a rubber with a high co-efficient of friction. Additionally, the cup shape structure of the cap 35, with its top rim, provides for mechanical interlocking between the operator's finger and the cap 35.

The thin square shaft is made of a flexible and elastic material which could be polycarbonate, a flexible metal, or other appropriate material. In the preferred embodiment, when the shaft 33 is made of polycarbonate, the base 32 is also made of polycarbonate and both are made together as a unified structure. Thus, a firm and resilient connection is assured between the base and shaft. If the shaft 33 is made of metal it would preferably be steel and be hot soldered to a steel base by silver solder. Such a connection, when properly soldered, provides a firm and resilient connection between shaft 33 and base 32.

The height of the shaft 33, when installed in the key pad area, is at a maximum 1 millimeter above the height of the surrounding keys. This allows easy access by the index finger or other fingers of a keyboard operator when the pointing function is to be used. However, the top of the shaft is not so high that it interferes with the normal movement of the fingers along the keyboard.

FIG. 7A shows one means for generating and transmitting a signal to move the cursor. Two strain gages 91, with associated electrical leads 72, are placed on the orthogonal sides of the shaft 33. Strain gages formed from piezoresistive sensors and other sensors are well known in the art. When a force, such as pressure from an operator's finger, is applied to the shaft 33, changes in voltage or resistance across the strain gages are sensed. The resulting electrical signals reflect the direction and amount of force applied to the pointing stick shaft 33. The generated signals are transmitted by leads 72 to the data processing unit for processing. In the preferred embodiment, only two strain gages are used on two surfaces of the shaft which are at right angles. Under most operating conditions, two are adequate. Another alternative is to put four strain gages on the shaft, one on each side of the shaft. However, this is more costly and would only be warranted in extraordinary operating environments where thermal stability is a problem.

The configuration of the base 32 of the analog input unit 31, as depicted in FIG. 7A, facilitates placement of this unit between two keys of a keyboard, as depicted in FIG. 6. However, it may be more desirable in certain circumstances to place the analog input unit 31 at some other position such as above or below two keys instead of directly between them. Accordingly, the base 32A as depicted in FIG. 7B has been altered to allow for placement of the analog input unit 31 at an upper corner of two keys on the keyboard. In this configuration, the modified key caps 56 and 56' as depicted in FIG. 2A, might be used in an alternate version of kit 10.

FIGS. 8A and 8B depict the analog input device 31 installed between two keys of a keyboard. FIG. 8A presents a perspective view, showing the square shaft 33 and cap top 35 of the analog input device 31. A front elevational view is shown in FIG. 8B, with the square shaft 31 and the cap 35 projecting slightly above the tactile surfaces of the two adjoining key caps of the keyboard.

FIG. 6 shows the digital input device 42 fully mounted on the frame of the keyboard. In the depicted embodiment, there are two separate low profile keys 43 in the low profile key pad. In the preferred embodiment, these keys 43 serve the equivalent function of mouse keys 27, as depicted on the mouse 25 in FIG. 6. A mouse and its functions are well known in the art.

The keys of a mouse and also in the preferred embodiment of this invention the keys 43 of the digital input device 42 would have functions determined by the particular applications program being run on the computer. As is well known in the art, various results can be obtained from these keys depending upon the key that is pushed, whether it is clicked quickly, then released, held or clicked twice, etc. There are many functions that can be performed by the keys 43 when used in conjunction with the analog input unit 31. In a word processing program for example, the analog input unit 31 would, when activated by the user, move the cursor about the CRT screen. Upon reaching the appropriate spot, the digital input keys 43 would be clicked, held, etc., to create the desired result. The desired result could be the accessing of a menu, implementation of an activity through the menu, movement of text around the screen, deleting of text or any number of other functions that pointing devices are used for in word processing programs.

Data processing unit 41 can be implemented using known devices. Various forms of controllers that could be used by the data processing unit 41 are set forth in detail in the Rutledge and Selker article cited above and in a patent application entitled "Controller for Improved Computer Pointing Devices", International Application Number PCT/US90/06830, filed Nov. 29, 1990 in the U.S. Patent Office. This application is incorporated herein by reference.

The signal generated by the data processing unit 41, in a preferred embodiment, is in a form compatible with any of a number of currently available mouse drivers. As previously noted, the data processing unit 41 and, thus, the whole assembly is powered by the computer exactly the same way as a mouse, which is common knowledge in the art. Accordingly, since the present invention lacks the electro-mechanical structures of a mouse, it does not draw as much power from the computer.

When the data processing unit 41 is configured in the fashion taught by the aforementioned application PCT No. US90/06830, a standard mouse can be added to the unit by connecting it to the mouse port 81 on the back of the data processing unit 41. The data processing unit 41 can then process and transmit signals received from the mouse 25 and from the analog and digital input units 31 and 42. Both the mouse 25 and the analog and digital input units 31 and 42 can be used at the same time. These two pointing devices can either be used separately while connected to common transmission lines or they can be used in coordination, their signals being combined in some fashion, resulting in a specified movement of the cursor on the computer screen. The combination of their signals in the preferred embodiment would be in a linear fashion; however, the signals could be combined in other ways.

Once the signal generated by the data processing unit 41 reaches the CPU over line 75, the signal would enter the CPU 22 through any of the various common ports not shown but well known in the art. The RS-232 port, PS/2 port, or some common parallel port such as one designed for receiving a signal generated by a quadrature technique, are some of the possible ports that could be used. Naturally, the specific port used would depend on the type of signal generated by the data processing unit 41. Once in the CPU, the signals would be interpreted by a standard mouse driver, well known in the industry, which in turn would interface with an application program, also well known in the art, to produce the desired movement and actions on the screen.

An additional variation on the physical structure of the data processing unit will now be described with reference to FIGS. 9, 10A, 10B, 10C, 10D and 10E. FIG. 9 shows the rear of a standard "G" keyboard used on most IBM PS/2 Systems, as well as RS/6000 Systems. As illustrated, there is a recess 83 where the outlet 84 for the keyboard is located. In this embodiment of the invention, the housing of the data processing unit 41 is configured to fit flushly into the keyboard outlet recess 83.

A side view of a suitably configured data processing unit 86 is shown in FIG. 10A, along with the connecting strip 71, which runs from the data processing unit 86 to the digital input means 42. Data processing unit 86 has a plug 87 which fits into the keyboard outlet 84. As shown in the rear view of FIG. 10B, data processing unit 86 also includes a mouse port 81 and an outlet port 88 at its rear. The mouse port 81 serves the same function as the mouse port of the earlier described data processing unit 41. The outlet 88 provides a means for connecting a special cord 90 that transmits both the signal from the data processing unit 86 and the signal from the keyboard 23 to the CPU. FIG. 10C is an elevated view from the rear of the data processing unit 86 which also shows plug 87.

Referring now to FIGS. 10B and 10D, plug 91 at the end of cord 90 plugs into outlet 88 on the rear of data processing unit 86. Plug 93 of cord 90 plugs into the appropriate keyboard port on the CPU and plug 92 of cord 90 plugs into the appropriate CPU port for receiving the signal from the data processing unit 86. This embodiment eliminates the clutter of an extra cord and projection of the data processing unit out from the surface in back of the "G" keyboard. Obviously, this approach can be implemented on other keyboards provided they have a recess which can accommodate the data processing unit. FIG. 10E depicts another possible version, where the cable is permanently attached to the data processing unit 86.

In another variation of the pointing device assembly the connecting bands 71 and 73, analog input unit 31 and digital input unit 42 are fabricated as a single pre-connected input unit (not shown). However, the data processing unit 41 is not permanently connected to the pre-connected input unit through the connective band 71. Data processing unit 41 is detachably connected to the pre-connected input unit. The mechanism for detachably connecting a data processing unit to the input unit would include a connector on band 71 and a receptacle on the data processing unit for receiving connector. In the preferred embodiment, connector and receptacle are flexible circuit board edge connectors. It will be apparent to those familiar with the art that other variations of the connectors to connect band 71 to the data processing unit can be used.

The configuration as described above allows for additional flexibility and options in the marketing and manufacturing of the invention. Different data processing units can be combined with various configurations of the pre-connected input unit which can be configured for different keyboards. In addition, the pre-connected input unit can be fabricated in a number of variations that would allow for placement of the analog and digital input units at various positions on or in the keyboard.

From the foregoing description, it will be readily apparent that a kit has been developed which allows a keyboard of an existing computer system to be rapidly and easily retrofitted with a pointing device. The pre-connected pointing device assembly of the present invention is constructed and configured to ensure optimal placement and secure attachment to the keyboard of analog and digital input units, the data processing unit and electrical interconnections, without adversely affecting the normal functioning or aesthetic appearance of the keyboard. The keyboard mounted pointing device of the present invention can replace or "supplement" the usual auxiliary pointing device while avoiding the loss of time, distraction and additional work space normally associated therewith.

While the invention has been particularly shown and described with reference to preferred embodiments thereof, it will be understood by those skilled in the art that various changes in form and detail may be made therein without departing from the spirit and scope of the invention.

We claim:

1. A pre-connected computer pointing device assembly for retrofitting onto a keyboard of an existing computer system comprising:

analog input means for sensing tactile input and producing a first signal representative thereof, said analog input means being adapted for mounting between adjacent keys of the keyboard, said analog input means comprising an isometric pointing stick;

digital input means for producing a second signal, said digital input means comprising a low profile keypad adapted to be mounted on a peripheral area of the keyboard;

data processing means adapted to be mounted to a rear surface of the keyboard for processing said first and second signals;

flexible band means for physically and electrically connecting the analog input means and the digital input means to the data processing means, said flexible band means comprising a first strip physically connecting the analog input means to the digital input means and configured to fit between keys of the keyboard, and a second strip physically connecting the digital input means to the data processing means and adapted to traverse an underside of the keyboard; and means for affixing the analog input means, the digital input means, the data processing means and the flexible band means onto the keyboard of the existing computer system such that they do not interfere with the normal operation of the keyboard, said means for affixing comprising a pre-coating of adhesive on a keyboard abutting surface of the analog input means, digital input means, data processing means and flexible band means.

2. The assembly of claim 1 wherein said first strip includes a jog.

3. The assembly of claim 2 further comprising a protective sheet having the same general contours as the second strip and a pre-coated adhesive on one side thereof, whereby the protective sheet can be adhesively secured upon the second strip.

4. The assembly of claim 3, wherein an exposed surface of the protective sheet has the same color as the keyboard.

5. The assembly of claim 3 wherein the flexible band means is detachably connected to the data processing means.

6. The assembly of claim 1 wherein said second strip is detachably connected to the data processing means.

7. A pre-connected computer pointing device assembly for retrofitting onto a keyboard of an existing computer system comprising:

analog input means for sensing tactile input and producing a first signal representative thereof, said analog input means comprising an isometric pointing stick adapted for mounting between adjacent keys of the keyboard;

digital input means for producing a second signal, said digital input means comprising a low profile keypad adapted to be mounted on a peripheral area of the keyboard;

data processing means for processing said first and second signals, said data processing means being adapted to be mounted to a rear surface of the keyboard, wherein said data processing means further comprises a port receiving signals from an auxiliary pointing device and an outlet for transmitting signals to a central processing unit;

flexible band means for physically and electrically connecting the analog input means and the digital input means to the data processing means, said flexible band means comprising a first strip configured to fit between keys of the keyboard and a second strip adapted to traverse an underside of the keyboard; and means for affixing the analog input means, the digital input means, the data processing means and the flexible band means onto the keyboard of the existing computer system such that they do not interfere with the normal operation of the keyboard, said means for affixing comprising adhesive.

8. The assembly of claim 7, further comprising a band of flexible material attached to the top of the data processing means, said band being adapted to be adhesively secured to the top of the keyboard.

9. A pre-connected computer pointing device assembly for retrofitting onto a keyboard of an existing computer system comprising:

analog input means for sensing tactile input and producing a first signal representative thereof, said analog input means comprising an isometric pointing stick adapted for mounting between adjacent keys of the keyboard;

digital input means for producing a second signal, said digital input means comprising a low profile keypad adapted to be mounted on a peripheral area of the keyboard;

data processing means for processing said first and second signals, said data processing means being adapted to be mounted to a rear surface of the keyboard;

flexible band means for physically and electrically connecting the analog input means and the digital input means to the data processing means, said flexible band means comprising a first strip configured to fit between keys of the keyboard and a second strip adapted to traverse an underside of the keyboard;

means for affixing the analog input means, the digital input means, the data processing means and the flexible band means onto the keyboard of the existing computer system such that they do not interfere with the normal operation of the keyboard, said means for affixing comprising adhesive;

a data processing housing sized to fit flushly into a keyboard outlet recess of the keyboard;

the data processing housing having a connector positioned to connect into a keyboard outlet of the keyboard;

an outlet at the rear of the data processing housing to output both a signal of the data processing means and a signal of the keyboard;

means to transmit the signal of the keyboard to a keyboard port of a CPU; and means to transmit the signal of the data processing means to an auxiliary port of the CPU.

10. The assembly of claim 9 wherein the means to transmit the signal of the keyboard to the keyboard port of the CPU and the means to transmit the signal of the data processing means to the auxiliary port of the CPU use a common cable; said cable having a first receptor to plug into the data processing housing, a second receptor to plug into the keyboard port of the CPU, and a third receptor to plug into the auxiliary port of the CPU.

11. The assembly of claim 10 wherein the cable is permanently connected to the data processing housing.

12. A kit for retrofitting a pointing device onto a keyboard of an existing computer system comprising:

a pre-connected pointing device assembly comprising an analog input unit for sensing tactile input and producing a first signal representative thereof, a digital input unit comprising a low profile key pad adapted to be mounted on a peripheral area of the keyboard for producing a second signal, and a data processing unit adapted to be mounted to a rear surface of the keyboard for processing said first and second signals, all of said units being physically interconnected by a thin, flexible band of material comprising a first strip configured to fit between keys of the keyboard and a second strip adapted to traverse an underside of the keyboard, and wherein the digital input unit is electrically connected via the flexible band of material to the data processing unit and the analog input unit is electrically connected via the flexible band of material to the data processing unit, and wherein the pointing device assembly is sized and configured such that when installed on the keyboard, the analog input unit fits between keys of the keyboard without restricting normal keyboarding activities, the digital input unit is positioned in a peripheral area of the keyboard, the data processing unit is located at the rear of the keyboard, and the band of flexible material runs over a base beneath the keys of the keyboard, and further comprising means for affixing the so positioned analog input unit, digital input unit, data processing unit and band of flexible material onto the keyboard, said means for affixing comprising a pre-coating of adhesive on a keyboard abutting surface of the analog input unit, digital input unit, data processing unit and the flexible band;

means for interfacing the data processing unit to the computer system;

a data processing housing sized to fit flushly into a keyboard outlet recess of the keyboard;

the data processing housing having a connector positioned to connect into a keyboard outlet of the keyboard;

an outlet at the rear of the data processing housing to output both a signal of the data processing unit and a signal of the keyboard;

means to transmit the signal of the keyboard to a keyboard port of a CPU; and means to transmit the signal of the data processing unit to an auxiliary port of the CPU.

13. The kit of claim 12 further comprising one or more replacement key caps to replace key caps on the keyboard, said replacement key caps having appropriate modifications to accommodate the presence of the analog input unit.

14. The kit of claim 13 further comprising an instrument to remove existing key caps on a computer keyboard.

15. The kit of claim 12 wherein the flexible band of material is detachably connected to the data processing unit.

16. The kit of claim 15 wherein the analog input unit, the digital input unit and the flexible band of material comprise a pre-connected input unit separable from the data processing unit.

17. A computer pointing device assembly for retrofitting to a keyboard of an existing computer system comprising:

analog input means for sensing tactile input and producing a first signal representative thereof;

digital input means for producing a second signal;

data processing means for processing said first and second signals;

means for electrically connecting the analog input means and the digital input means to the data processing means;

means for physically attaching the analog input means and the digital input means onto a keyboard of an existing computer system; and means for interfacing the data processing means to a CPU of the computer system; and wherein the data processing means further comprises:

a data processing housing sized to fit flushly into a keyboard outlet recess of the keyboard, the data processing housing having a connector positioned to connect into a keyboard outlet of the keyboard, an outlet at the rear of the data processing housing to output both a signal of the data processing means and a signal of the keyboard, means to transmit the signal of the keyboard to a keyboard port on the CPU, and means to transmit the signal of the data processing means to an auxiliary port in the CPU.

\* \* \* \* \*

UNITED STATES PATENT AND TRADEMARK OFFICE
CERTIFICATE OF CORRECTION

PATENT NO. : 5,579,033

DATED : November 26, 1996

INVENTOR(S) : Joseph D. Rutledge, et al

It is certified that error appears in the above-identified patent and that said Letters Patent is hereby corrected as shown below:

In the drawings, Sheet 5 of 8, delete Figs. 11 and 12.

Signed and Sealed this

Third Day of June, 1997

Attest:

BRUCE LEHMAN

*Attesting Officer*  *Commissioner of Patents and Trademarks*